US005609786A

United States Patent [19]
An

[11] Patent Number: 5,609,786
[45] Date of Patent: Mar. 11, 1997

[54] MICROWAVE OVEN AND METHOD OF CONTROLLING THE OPERATION THEREOF

[75] Inventor: Hyun-Jun An, Suwon, Rep. of Korea

[73] Assignee: Samsung Electronics Co., Ltd., Kyungki-do, Rep. of Korea

[21] Appl. No.: 507,560

[22] Filed: Jul. 26, 1995

[30] Foreign Application Priority Data

Jul. 26, 1994 [KR] Rep. of Korea .................. 94-18080

[51] Int. Cl.$^6$ ........................................... H05B 6/68
[52] U.S. Cl. ......................... 219/702; 219/719; 219/720
[58] Field of Search ............................ 219/702, 715, 219/719, 720, 723

[56] References Cited

U.S. PATENT DOCUMENTS

| | | | |
|---|---|---|---|
| 3,790,815 | 2/1974 | Karklys | 307/141 |
| 4,431,893 | 2/1984 | Levie | 219/720 |
| 4,486,648 | 12/1984 | Grasso | 219/501 |
| 4,613,952 | 9/1986 | McClanahan | 364/578 |

Primary Examiner—Philip H. Leung
Attorney, Agent, or Firm—Burns, Doane, Swecker & Mathis, L.L.P.

[57] ABSTRACT

A microwave oven and a method of controlling the operation thereof in which an algorithm is provided to operate the microwave oven virtually. The microwave oven comprises a control unit including a microcontroller for storing a program therein, an operating panel including a plurality of keys for inputting key signals regarding various functions of a cooking operation, a display unit for displaying the contents inputted through the operating panel, and a magnetron for generating a microwave under the control of the control unit. The microwave oven further comprises a key select device for selecting a desired one of the plurality of keys on the operating panel to operate the microwave oven virtually, and a simulated operation change device for changing the operation of the microwave oven to a simulated operation in response to the key being selected by the key select device.

10 Claims, 4 Drawing Sheets

MICROWAVE OVEN AND METHOD OF CONTROLLING THE OPERATION THEREOF

BACKGROUND

1. Field of the Invention

The present invention relates in general to a method and an apparatus for operating a microwave oven, and more particularly to a microwave oven and a method of controlling the operation thereof in which an algorithm is provided to virtually operate the microwave oven.

2. Description of the Related Art

Generally, microwave ovens utilize microwaves when cooking food. In other words, when the microwaves are applied to food, molecules in the food move, resulting in the generation of frictional heat. As a result, the food is heated by the frictional heat.

The microwaves are generated by a magnetron which performs an oscillating operation at a fundamental frequency of 2450 MHz.

FIG. 1 shows such a microwave oven performing a cooking operation by heating the food with the microwaves generated by the magnetron. As shown in this drawing, the microwave oven comprises a magnetron 36, an oscillator 37 connected to the magnetron 36 for oscillating the magnetron 36 at a desired frequency, a high-voltage transformer 38 connected to the magnetron 36 and the oscillator 37 for applying a high voltage to the magnetron 36, a lamp 33 for lighting the inside of a cooking chamber (not shown), a turntable motor 34 for rotating food (not shown) so that the food can evenly be cooked during the operation of the magnetron 36, a fan motor 35 for cooling the magnetron 36 and circulating air in the cooking chamber during the operation of the magnetron 36, a main relay 31 being turned on/off to control alternating current (referred to hereinafter as AC) power supply to the lamp 33, the turntable motor 34 and the fan motor 35, and a power relay 32 being turned on/off to control AC power supply to the magnetron 36.

The microwave oven further comprises an operating panel 13 and a display unit 11. As shown in FIG. 2, the operating panel 13 includes a plurality of key switches for inputting key signals regarding various functions desired by the user, such as cooking time, cooking menu, microwave oven output, cooking start and cooking stop. The display unit 11 is adapted to display the cooking function which the user selects through the operating panel 13 and the operating state of the microwave oven externally.

The microwave oven further comprises a control unit 20 for controlling the main relay 31 and the power relay 32 in response to the key signals inputted by the operating panel 13, to drive the magnetron 36 and the turntable motor 34. The control unit 20 also acts to display the inputted contents through the display unit 11.

The control unit 20 includes a microcontroller 25 for storing a program therein, an input buffer 23 for buffering the key signals inputted by the operating panel 13 and transferring the buffered signals to the microcontroller 25, a display driver 21 for driving the display unit 11 under the control of the microcontroller 25, and a load driver 27 for driving the main relay 31 and the power relay 32 under the control of the microcontroller 25.

The operation of the microwave oven with the above-mentioned construction will hereinafter be described.

First, the user positions the food on a turntable (not shown) and operates the key switches on the operating panel 13. Then, in response to the key signals inputted by the operating panel 13, the control unit 20 controls the main relay 31 and the power relay 32 to drive the turntable motor 34, the fan motor 35 and the magnetron 36.

As the power relay 32 is turned on, the high-voltage transformer 38 applies the high voltage to the magnetron 36, thereby causing the magnetron 36 to generate the microwaves. As a result, the food on the turntable is heated by the microwaves from the magnetron 36, while being rotated by the turntable motor 34. In this manner, the cooking operation of the microwave oven is performed.

At this time, the display unit 11 is driven by the display driver 21 under the control of the microcontroller 25 to display the cooking time, operating time, etc.

As mentioned above, the microwave oven is a kitchen utensil in which potentially dangerous microwaves are present and the accompanying heat is considerably high. Also, it is complex to operate the operating panel in the microwave oven. Further, the microwave oven has various functions. For this reason, it is necessary for the user to learn the operating method upon or after purchasing the microwave oven.

However, the user is liable to avoid testing the operation of the microwave oven due to the existence of potentially dangerous microwaves. In this connection, it is difficult for the user to learn the operating method of the microwave oven.

The user must wait for an amount of time equal to the actual cooking time even though they are only testing the operation of the microwave oven. Furthermore, the user has the trouble of putting food or water into the microwave oven to avoid overheating the microwave oven during the operation test.

SUMMARY

Therefore, the present invention has been made in view of the above problems, and it is an object of the present invention to provide a microwave oven and a method of controlling the operation thereof in which the generation of microwaves is interrupted during operation test and the operation testing time is shorter than the time of actually cooking food, so that the user can readily learn how to operate the microwave oven.

It is another object of the present invention to provide a microwave oven and a method of controlling the operation thereof in which an algorithm is programmed in a microcomputer to virtually operate the microwave oven, so that the user can rapidly learn how to operate and conveniently use the microwave oven, thereby satisfying customers' interest.

In accordance with one aspect of the present invention, there is provided a microwave oven comprising control means including a microcontroller for storing a program therein, operating means including a plurality of keys for inputting key signals regarding various functions of a cooking operation, display means for displaying the contents inputted through said operating means, and a magnetron for generating a microwave under the control of said control means, wherein the improvement comprises key select means for selecting a desired one of said plurality of keys on said operating means to virtually operate said microwave oven; and simulated operation change means for changing the operation of said microwave oven to a simulated operation in response to said key being selected by said key select means.

In accordance with another aspect of the present invention, there is provided a method of controlling the operation of a microwave oven, said microwave oven comprising control means including a microcontroller for storing a program therein, operating means including a plurality of keys for inputting key signals regarding various functions of a cooking operation, display means for displaying the contents inputted through said operating means, and a magnetron for generating a microwave under the control of said control means, comprising the steps of selecting a desired one of said plurality of keys on said operating means to virtually operate said microwave oven; and changing the operation of said microwave oven to a simulated operation in response to said key being selected and then operating said microwave oven virtually by selectively using said plurality of keys on said operating means.

BRIEF DESCRIPTION OF THE DRAWINGS

The above and other objects, features and advantages of the present invention will be more clearly understood from the following detailed description taken in conjunction with the accompanying drawings, in which.

DETAILED DESCRIPTION OF THE PREFERRED EMBODIMENTS

Figure 1:
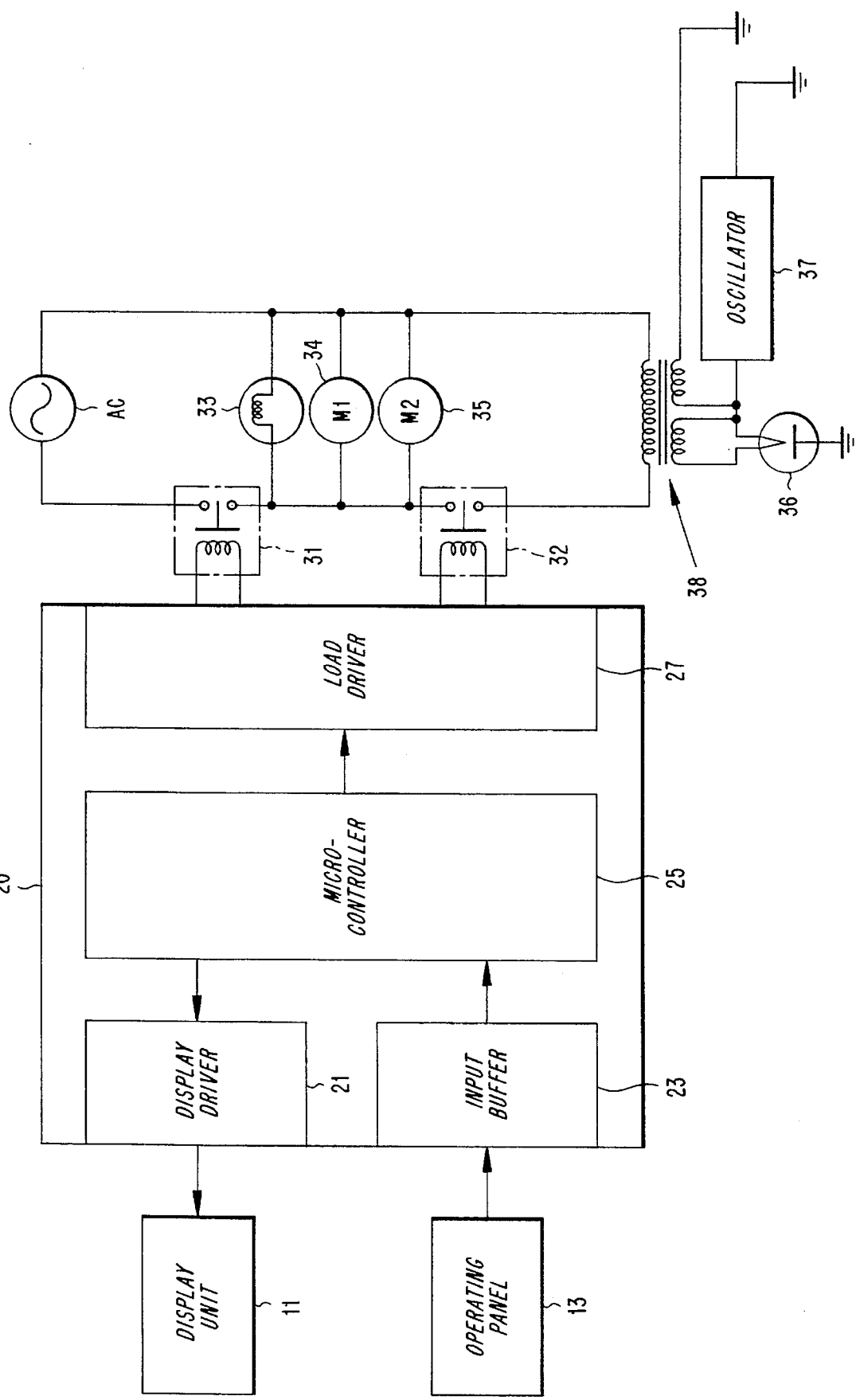
FIG. 1 is a view schematically illustrating a microwave oven which is applied to the present invention.

A main feature of the present invention is to perform a virtual, simulated operation of a microwave oven which is different from the actual operation of the microwave oven. The generation of microwaves is interrupted during the simulated operation of the microwave oven and the simulated operating time is shorter than the time of actually cooking food. The microwave oven applied to the present invention is substantially the same in construction as that in FIGS. 1 and 2.

In accordance with the preferred embodiment of the present invention, simulated operation keys and simulated operation release keys are designated among the keys on the operating panel 13 and the corresponding key information is stored in the microcontroller 25 in the control unit 20. The simulated operation keys act to change the operation of the microwave oven to the virtual, simulated operation which is different from the actual operation of the microwave oven. The simulated operation release keys function to end or release the virtual, simulated operation.

Also, in accordance with the preferred embodiment of the present invention, the microwave oven comprises simulated operation change means for changing the operation of the microwave oven to the virtual, simulated operation if the simulated operation keys are selected, simulated operation means for allowing the microwave oven to perform the virtual, simulated operation as the simulated operation keys are selected, and simulated operation release means for selecting the simulated operation release keys to end or release the virtual, simulated operation.

The simulated operation change means, the simulated operation means and the simulated operation release means have algorithmic forms to be additionally stored as subroutines in a program of the microcontroller 25 in the control unit 20.

Now, the operation of the microwave oven with the above-mentioned construction and a method of controlling the same in accordance with the present invention will be mentioned in detail.

Figure 3:
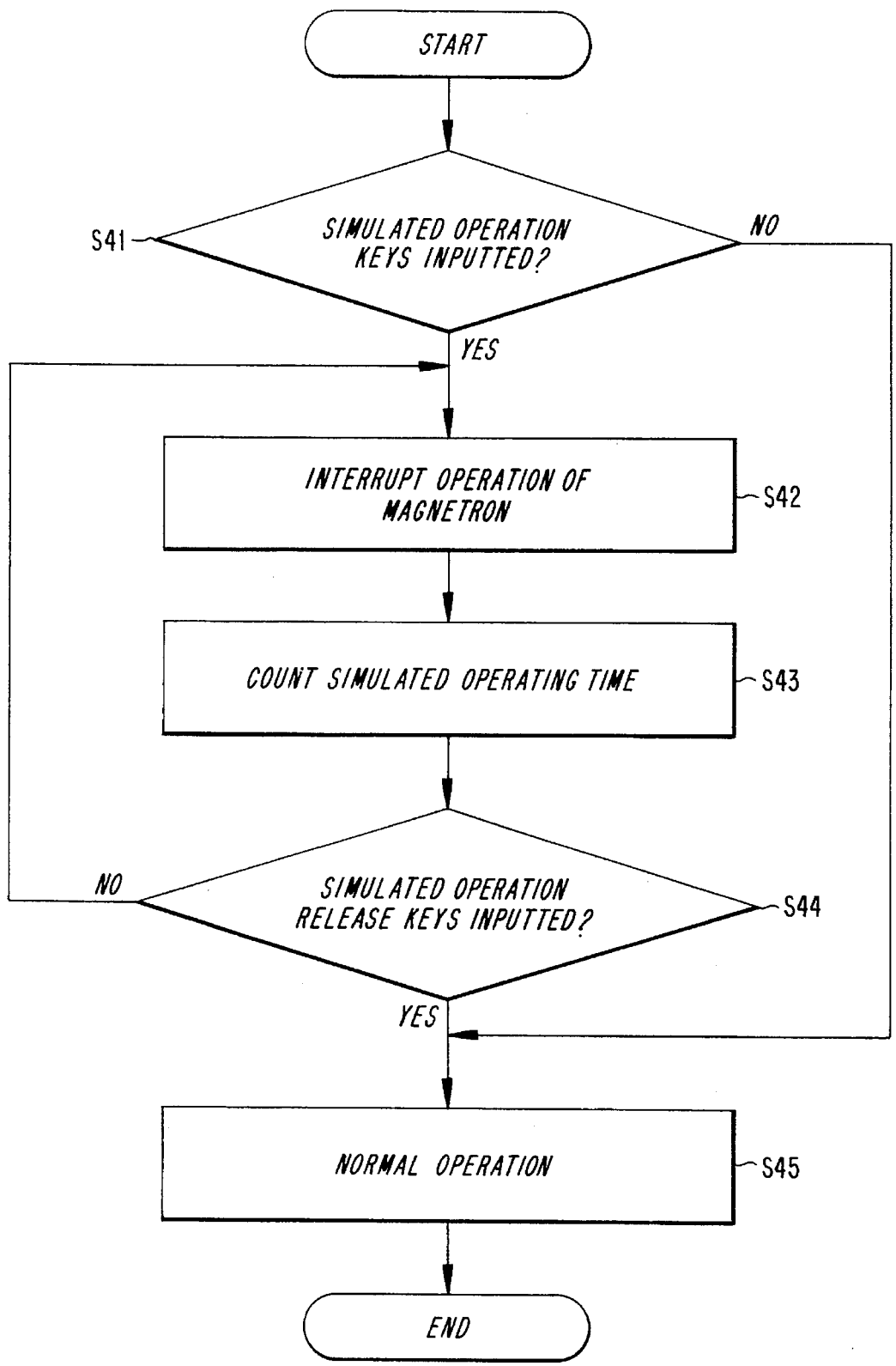
FIG. 3 is a flowchart illustrating a routine of controlling a simulated operation of the microwave oven in FIGS. 1 and 2 in accordance with the present invention.
Figure 4:
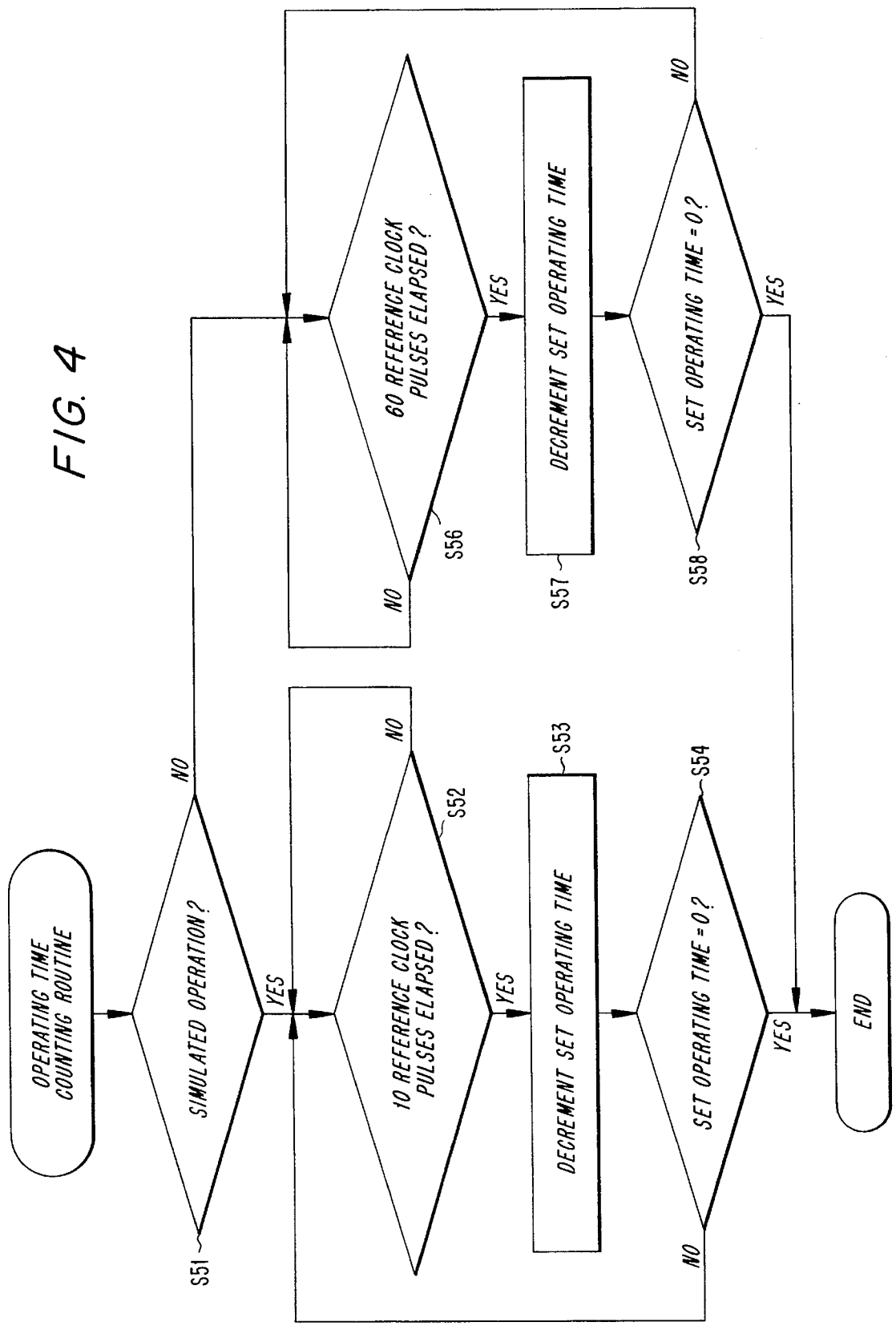
FIG. 4 is a flowchart illustrating a routine of counting the operating time of the microwave oven in FIGS. 1 and 2 in accordance with the present invention.

FIG. 3 is a flowchart illustrating a routine of controlling the simulated operation of the microwave oven in accordance with the present invention, and FIG. 4 is a flowchart illustrating a routine of counting the operating time of the microwave oven in accordance with the present invention. Here, the reference numeral "S" designates each step in FIGS. 3 and 4.

First, the simulated operation keys and the simulated operation release keys are designated among the keys on the operating panel 13 and the corresponding key information is stored on a routine in the program of the microcontroller 25 in the control unit 20.

Figure 2:
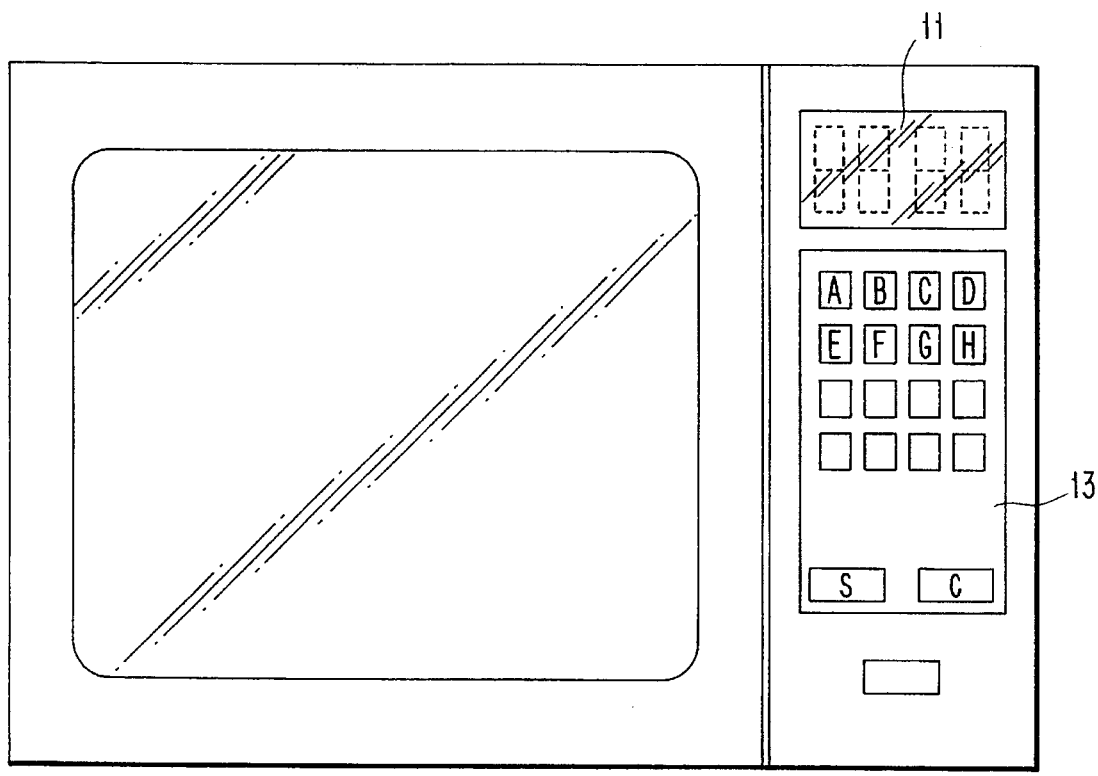
FIG. 2 is a front view of the microwave oven in FIG. 1.

For example, key select means is programmed to execute the virtual, simulated operation of the microwave oven by simultaneously or sequentially pushing the keys A, B and C on the operating panel 13 in FIG. 2 and to release it by simultaneously or sequentially pushing the keys E, F and G on the operating panel 13 in FIG. 2. The programmed key select means is additionally stored in the program of the microcontroller 25 in the control unit 20.

Under the condition that the simulated operation keys and the simulated operation release keys are designated among the keys on the operating panel 13 and the corresponding key information is stored in the program of the microcontroller 25 in the control unit 20, the user can change the operation of the microwave oven to the simulated operation by selecting the simulated operation keys.

Namely, if the simulated operation keys are selected on the operating panel 13 and the corresponding key signals are applied to the microcontroller 25 in the control unit 20, characters indicative of the simulated operation state are displayed on the display unit 11. Also, as shown in FIG. 3, the generation of the microwaves is interrupted and the simulated operation of the microwave oven is performed for the simulated operating time which is shorter than the actual operating time, as will hereinafter be described in more detail.

Preferably, the simulated operation control routine in FIG. 3 which changes the operation of the microwave oven to the simulated operation is programmed and stored in the microcontroller 25 in the control unit 20. In accordance with the preferred embodiment of the present invention, the simulated operation change program is the simulated operation change means as mentioned above.

At step S41 in FIG. 3, it is determined whether or not the simulated operation keys on the operating panel 13 such as, for example, keys A, B and C are selected and whether or not the corresponding key signals are applied to the microcontroller 25. If the simulated operation key signals are inputted, or if YES at step S41, the control unit 20 turns off the power relay 32 associated with the magnetron 36 at step S42 so that dangerous microwaves cannot be generated from the magnetron 36.

At this time, the control unit 20 drives the turntable motor 34 and the fan motor 35 in a similar manner to the normal state.

If the simulated operation key signals are inputted and the operation of the magnetron 36 is interrupted, the program of the microcontroller 25 is executed at step S43 so that the simulated operation of the microwave oven can be performed for the simulated operating time which is shorter than the actual operating time, because the simulated operation of the microwave oven is performed with the object of observing only the operating state of the microwave oven. Step S43 will hereinafter be described in more detail with reference to the operating time counting routine of FIG. 4.

In the case where a simulated operation mode is selected, or if YES at step S51, the microcontroller 25 checks at step S52 whether 10 reference clock pulses have elapsed. If 10 reference clock pulses have not elapsed, or if NO at step S52, the microcontroller 25 returns to step S52 to repeatedly perform it until 10 reference clock pulses have elapsed.

If 10 reference clock pulses have elapsed, or if YES at step S52, the microcontroller 25 proceeds to step S53 to regard the lapse of the 10 reference clock pulses as that of one second and decrement the set operating time.

At step S54, the microcontroller 25 checks whether the set operating time is "0". If the set operating time is not "0", or if NO at step S54, the microcontroller 25 returns to step S52 to repeatedly perform the above operation beginning with step S52 until the set operating time becomes "0".

If the set operating time is "0", or if YES at step S54, the microcontroller 25 ends the simulated operation.

Preferably, the microcontroller 25 is programmed to automatically change the simulated operation mode to the normal operation mode if the set operating time becomes "0". Such a program has the effect of preventing the user from interpreting the virtual, simulated operation as a faulty operation.

On the other hand, in the case where the simulated operation mode is not selected, or if NO at step S51, the microcontroller 25 proceeds to step S56 because the microwave oven is in the normal operation mode. At step S56, the microcontroller 25 checks whether 60 reference clock pulses have elapsed. If 60 reference clock pulses have not elapsed, or if NO at step S56, the microcontroller 25 returns to step S56 to repeatedly perform it until 60 reference clock pulses have elapsed.

If 60 reference clock pulses have elapsed, or if YES at step S56, the microcontroller 25 proceeds to step S57 to regard the lapse of the 60 reference clock pulses as that of one second and decrement the set operating time.

The microcontroller 25 checks at step S58 whether the set operating time is "0". If the set operating time is not "0", or if NO at step S58, the microcontroller 25 returns to step S56 to repeatedly perform the above operation beginning with step S56 until the set operating time becomes "0".

If the set operating time is "0", or if YES at step S58, the microcontroller 25 ends the normal operation.

The simulated operating time can be six times as short as the normal operating time since 10 reference clock pulses are regarded as one second in the simulated operation mode, whereas 60 reference clock pulses are regarded as one second in the normal operation mode.

Although 10 reference clock pulses have been set to one second in the preferred embodiment of the present invention, the number may be set differently to make the simulated operating time faster or slower.

The simulated operation of the microwave oven can be released by simultaneously or sequentially selecting the simulated operation release keys on the operating panel 13 such as, for example, keys E, F and G. Alternatively, a stop key S or a cancel key C may be set to the simulated operation release key.

It is checked at step S44 whether or not the simulated operation release keys are selected and whether or not the corresponding key signals are applied to the microcontroller 25. If the simulated operation release key signals are not inputted, or if NO at step S44, the microcontroller 25 returns to step S42 to repeatedly perform the above operation beginning with step S42 until the simulated operation release key signals are inputted.

If the simulated operation release key signals are inputted, or if YES at step S44, the microcontroller 25 proceeds to step S45 to perform the normal operation of the microwave oven. As a result, the microcontroller 25 controls the operations of the turntable motor 34 and fan motor 35. Then, the microcontroller 25 ends the normal operation.

If the simulated operation key signals are not inputted, or if NO at step S41, the microcontroller 25 proceeds to step S45 to perform the normal operation of the microwave oven. Then, the microcontroller 25 ends the normal operation.

As apparent from the above description, according to the present invention, the generation of the microwaves is interrupted during the operation test and the operation testing time is shorter than the actual operating time. Therefore, the user can readily learn how to operate the microwave oven. Also, the algorithm is programmed in the microcomputer to virtually operate the microwave oven. Therefore, the user can rapidly learn how to operate and conveniently use the microwave oven. These have the effect of satisfying customers' interest.

Although the preferred embodiments of the present invention have been disclosed for illustrative purposes, those skilled in the art will appreciate that various modifications, additions and substitutions are possible, without departing from the scope and spirit of the invention as disclosed in the accompanying claims.

What is claimed is:

1. A microwave oven comprising:

operating means including a plurality of keys for inputting key signals representing functions of a cooking operation, key select means for selecting a desired one of said plurality of keys on said operating means to simulate the operation of said microwave oven;

simulated operation change means for changing the operation of said microwave oven to the simulated operation in response to said key being selected by said key select means; and control means, including a microcontroller, for storing an algorithm to simulate the operation of said microwave oven, wherein during the simulated operation, a magnetron is not operated.

2. A microwave oven as set forth in claim 1, wherein said key select means includes an algorithm, said algorithm being contained in said program.

3. A microwave oven as set forth in claim 1, wherein said simulated operation change means includes an algorithm, said algorithm being contained in said program.

4. A microwave oven as set forth in claim 1, further comprising means for performing the simulated operation of the microwave oven for a simulated operating time, said simulated operating time being less than a set operating time.

5. A microwave oven as set forth in claim 1, further comprising means for releasing the simulated operation of the microwave oven after performing the simulated operation once.

6. A method of controlling the operation of a microwave oven, the method comprising the steps of:
   (a) selecting a desired one of a plurality of keys on an operating means to simulate the operation of said microwave oven;
   (b) changing the operation of said microwave oven to the simulated operation in response to said key being selected at said step (a) and then simulating the operation of said microwave oven by selectively using said plurality of keys on said operating means;
   (c) interrupting the operation of a magnetron during the simulated operation of the microwave oven;
   (d) adapting to scale a simulated operating time so that the simulated operating time is less than a set operating time input via the operating means;
   (e) decreasing the set operating time when 10 reference clock pulses have elapsed; and
   (f) ending the simulated operation when the set operating time is zero.

7. A method of controlling the operation of a microwave oven, as set forth in claim 6, wherein said step (a) includes the step of displaying a simulated operation state on said display means.

8. A method of controlling the operation of a microwave oven, the method comprising the steps of:
   (a) selecting a desired one of a plurality of keys on an operating means to simulate the operation of the microwave oven;
   (b) changing the operation of the microwave oven to the simulated operation in response to the key being selected in step (a), and then simulating the operation of the microwave oven by selectively using the plurality of keys on the operating means; and
   (c) interrupting the operation of a magnetron during the simulated operation of the microwave oven.

9. A method of controlling the operation of a microwave oven, as set forth in claim 8, wherein said step (b) includes the step of performing said simulated operation of said microwave oven for a simulated operating time, said simulated operating time being shorter than an actual operating time.

10. A method of controlling the operation of a microwave oven, as set forth in claim 8, wherein said step (b) includes the step of releasing said simulated operation of said microwave oven after performing said simulated operation once.

* * * * *